US00RE37789E

(19) United States
(12) Reissued Patent
Bertus et al.

(10) Patent Number: US RE37,789 E
(45) **Date of Reissued Patent: *Jul. 16, 2002**

(54) REGENERATING ZEOLITIC CRACKING CATALYST

(75) Inventors: Brent J. Bertus; Harold W. Mark; John S. Roberts; Arnold M. Schaffer, all of Bartlesville, OK (US)

(73) Assignee: Phillips Petroleum Company, Bartlesville, OK (US)

( * ) Notice: This patent is subject to a terminal disclaimer.

(21) Appl. No.: 08/648,520

(22) Filed: May 13, 1996

Related U.S. Patent Documents

Reissue of:
(64) Patent No.: 5,358,630
Issued: Oct. 25, 1994
Appl. No.: 06/207,511
Filed: Nov. 17, 1980

(51) Int. Cl.[7] ..... C10G 11/05; B01J 38/18; B01J 38/10

(52) U.S. Cl. ..... 208/120.2; 208/120.01; 208/52 CT; 502/41; 502/50; 502/521; 502/53

(58) Field of Search ..... 208/113, 120, 208/52 CT, 120.2, 120.01; 502/41, 50, 53, 521

(56) References Cited

U.S. PATENT DOCUMENTS

| | | | | |
|---|---|---|---|---|
| 2,274,988 | A | 3/1942 | Matuszak | 260/683 |
| 2,425,482 | A | 8/1947 | Moser | 96/52 |
| 2,575,258 | A | 11/1951 | Corneil et al. | 252/417 |
| 2,901,419 | A | 8/1959 | Brill | 208/119 |
| 2,956,003 | A | 10/1960 | Marshall et al. | 208/74 |
| 3,120,484 | A | 2/1964 | Mills et al. | 208/120 |
| 3,219,586 | A | 11/1965 | Erickson et al. | 252/415 |
| 3,220,956 | A | 11/1965 | Cramer et al. | 252/413 |
| 3,254,021 | A | 5/1966 | Mason et al. | 208/111 |
| 3,412,013 | A | 11/1968 | Bowles | 208/120 |
| 3,711,422 | A | 1/1973 | Johnson et al. | 252/414 |
| 3,977,963 | A | 8/1976 | Readal et al. | 208/120 |
| 4,013,546 | A | 3/1977 | Suggitt et al. | 252/415 |
| 4,025,458 | A | 5/1977 | McKay | 252/416 |
| 4,031,002 | A | 6/1977 | McKay | 208/113 |
| 4,064,036 | A | 12/1977 | Clark | 208/46 |
| 4,083,807 | A | 4/1978 | McKinney et al. | 252/455 Z |
| 4,141,858 | A | 2/1979 | McKay | 252/439 |
| 4,176,083 | A | 11/1979 | McGovern et al. | 252/411 R |
| 4,183,803 | A | 1/1980 | McKay | 208/120 |
| 4,216,120 | A | 8/1980 | Nielsen et al. | 252/430 |
| 4,257,876 | A | 3/1981 | McKay | 208/120 |
| 4,257,919 | A | 3/1981 | Roberts et al. | 252/461 |
| 4,268,416 | A | 5/1981 | Stine et al. | 252/416 |
| 4,276,149 | A | 6/1981 | Chester et al. | 208/120 |
| 4,280,895 | A | 7/1981 | Stuntz et al. | 208/113 |
| 4,280,896 | A | 7/1981 | Bearden et al. | 208/113 |
| 4,280,898 | A | 7/1981 | Tatterson et al. | 208/119 |
| 4,298,459 | A | 11/1981 | Tatterson et al. | 208/120 |
| 4,345,992 | A | 8/1982 | Washer et al. | 208/120 |
| 4,361,496 | A | 11/1982 | Castillo et al. | 252/416 |
| 4,364,848 | A | 12/1982 | Castillo et al. | 252/417 |
| 4,370,220 | A | 1/1983 | Bearden et al. | 208/108 |
| 4,372,841 | A | 2/1983 | Stuntz et al. | 208/113 |
| 4,382,015 | A | 5/1983 | Castillo et al. | 252/417 |
| 4,404,090 | A | 9/1983 | Castillo et al. | 208/120 |
| 4,409,093 | A | 10/1983 | Bearden, Jr. et al. | 208/108 |
| 4,447,552 | A | 5/1984 | Hayes et al. | 502/41 |
| 4,522,704 | A | 6/1985 | Bertsch | 208/113 |
| 4,551,231 | A | 11/1985 | Kovach et al. | 208/120 |

FOREIGN PATENT DOCUMENTS

| | | | |
|---|---|---|---|
| CA | 729167 | 3/1966 | 252/410 |
| EP | 0 052 356 | 5/1982 | |
| GB | 1570682 | 7/1980 | |
| JP | 53-142406 | 12/1978 | |
| JP | 55-61936 | 5/1980 | |

OTHER PUBLICATIONS

*Oil and Gas Journal*, vol. 70, No. 20, May 15, 1979, pp. 112–122.
*Ind. Eng. Chem. Prod. Res. Dev.*, vol. 19, (1980), pp. 209–213.
*Kirk–Othmer Encyclopedia of Chemical Technology*, 2d Ed., vol. 15, pp. 26–29.
*McGraw–Hill Encyclopedia of Science & Technology*, 6th Ed., pp. 494–497.
*Bulletin of the Chemical Society of Japan*, vol. 43, (1970), pp. 2186–2191.
*Oil and Gas Journal*, Nov. 19, 1973, pp. 49–53.
*Industrial and Engineering Chemistry*, pp. 276–282.

*Primary Examiner*—Walter D. Griffin
(74) *Attorney, Agent, or Firm*—Phillips Petroleum Co.

(57) ABSTRACT

A method for countering the adverse effect of contaminating metals on a crystalline aluminosilicate catalyst comprising contacting the catalyst with a reducing gas under suitable conditions.[In a preferred embodiment, the catalyst contains antimony.]

63 Claims, No Drawings

REGENERATING ZEOLITIC CRACKING CATALYST

Matter enclosed in heavy brackets [ ] appears in the original patent but forms no part of this reissue specification; matter printed in italics indicates the additions made by reissue.

*This application and copending application Ser. No. 08/648,236, filed May 9, 1996, are each reissues of U.S. Pat. No. 5,358,630 (application Ser. No. 06/207,511, filed Nov. 17, 1980.*

The present invention relates to the catalytic cracking of hydrocarbons, for example petroleum fractions. In another aspect, this invention relates to a method for countering the adverse effects that contaminating metals have on crystalline zeolite aluminosilicate cracking catalysts.

It is well known to employ catalysts for cracking, i.e. the conversion of relatively high molecular weight hydrocarbons, such as gas oil, petroleum residuum, and the like, to relatively low molecular weight hydrocarbons such as naphtha. As in any catalytic process deactivation of the catalyst is a significant economic factor in cracking.

Factors contributing to the deactivation of cracking catalysts include coke formation and the formation of deposits of contaminating metals such as nickel, vanadium, iron, and copper. These metals can come from erosion of the metallic equipment or from corresponding metals and metal compounds in the hydrocarbon feed. The coke can generally be removed by exposing deactivated catalyst to regeneration wherein the carbonaceous materials thereon are consumed by combustion.

U.S. Pat. No. 2,575,258 discloses countering the adverse effects of contaminating metals on certain cracking catalysts by exposing the catalyst to combustive regeneration followed by reduction with a reducing gas such as hydrogen. That patent does not, however, indicate whether such a process would be effective on zeolitic cracking catalysts of the type currently used in most modern cracking operations.

It is well recognized that zeolite and amorphous cracking catalysts are affected differently by contaminant metals. In amorphous cracking catalysts, these contaminant metals are deactivated by successive cracking cycles at a greater rate than on zeolitic cracking catalysts (Cimbalo, et al, Oil and Gas Journal, May 5, 1972, p. 112). Although a given level of contaminant metals has a greater effect on amorphous catalysts than on zeolitic catalysts, the long term effect is such that contaminant metals become significant in their effect on zeolitic cracking catalysts.

An object of the present invention is to provide a process for countering the adverse effects of contaminating metals on a crystalline zeolite cracking catalyst.

Other aspects, objects, and advantages of the present invention will be apparent from the following description.

In accordance with the present invention, there is provided a process for improving the activity of a cracking catalyst comprising crystalline zeolite aluminosilicate containing contaminating metals, said process comprising contacting said cracking catalyst with a reducing gas under suitable conditions. Where the cracking catalyst is a used catalyst having carbon deposited thereon, it is preferred to subject the catalyst to regeneration with a combustion supporting gas prior to contacting the catalyst with the reducing gas. The present invention is particularly beneficial for use with zeolite cracking catalysts containing antimony. In another aspect, the present invention relates to a process for catalytic cracking in which the zeolitic cracking catalysts [is]*are* improved by contact with a reducing gas.

Conditions necessary for catalytic cracking with crystalline zeolite aluminosilicate catalysts are well known in the art. The crystalline zeolite aluminosilicate cracking catalysts are generally comprised of a minor but catalytically active amount of the zeolite dispersed in an amorphous cracking catalyst. Typically, the cracking is conducted at temperatures in the range of about 800° F. to about 1200° F. Pressures can generally range from subatmospheric to about 3000 psig. Typically, the weight ratio of catalyst to hydrocarbon feed is in the range of about 3:1 to 30:1.

The hydrocarbon feed can include any that can be cracked to lighter products. Typical feeds include gas oils, fuel oils, cycle oils, slurry oils, topped crudes, oil from tar sands, heavy residual and the like. Many of the feeds currently employed contain at least one of the metals nickel, vanadium, and iron, generally in amounts within the ranges set forth in the following table:

| Metal | Content, ppm[(1)] |
|---|---|
| Nickel | .02 to 100 |
| Vanadium | .02 to 500 |
| Iron | .02 to 500 |

[(1)]The term "ppm" refers to parts per million of metal as the element by weight.

In regeneration carbonaceous materials on the used cracking catalyst are removed by contacting with a combustion-supporting gas, such as air, at a temperature sufficient to result in combustion of accumulated carbon. Typically, the regeneration is conducted at temperatures in the range of about 950° F. to 1500° F.

In the reducing step the regenerated catalyst is contacted with a reducing gas. Generally any suitable reducing gas can be employed. Examples include carbon monoxide, hydrogen, propane, methane, ethane, and mixtures thereof. Accordingly sources of reducing gas can include regenerator off gases or light gaseous streams from the cracker. It is currently preferred to employ a reducing gas containing hydrogen. The volume of reducing employed in contacting the catalyst and the temperatures and pressures maintained should be adjusted so as to convert substantially the contaminating metal oxides present in the catalyst to compounds having substantially less or no detrimental effect on the activity of the catalyst. Depending upon the nature of the contaminating materials and upon the amount and kind of reducing atmosphere employed, the temperature at which the contaminated catalyst is contacted with the reducing atmosphere can vary, but generally will be within the range of 850° F. to about 1300° F. Inasmuch as the pressure maintained in the several known catalyst cracking processes may differ and since the pressure maintained will have an influence on the reactions which take place in the reducing atmosphere, the temperature and throughput must be correlated in each instance with the pressure maintained in the particular unit. It should be remembered that the volume of reducing gas required will also depend upon the nature and amount of the contaminating oxides. When relatively small quantities of contaminating oxides are present in the catalyst, very small volumes of reducing gas and/or short contact times may be employed with satisfactory results, while when relatively large quantities of contaminating oxides are present in the catalyst larger volumes of reducing gas and/or long contact times will be required. Typically the amount of hydrogen injected will be in the range of about 0.1 to about 20 standard cubic feet per minute per pound of contaminating metals on the catalyst. Contact times will generally be in the range of about 0.05 minutes to 2 hours, preferably about 5 to about 30 minutes.

The present invention can be used in conjunction with other techniques for countering the adverse effects of contaminating metals. Thus the reduction can be applied to crystalline zeolite cracking catalysts that have been treated with agents known to counter the adverse effects of such contaminants. A number of such agents are known in the art. Typical are those disclosed in U.S. Pat. Nos. 2,901,419; 3,711,422; 4,025,458; and 4,031,002, the disclosures of which are incorporated herein by reference. The reduction technique is particularly beneficial when employed on a crystalline aluminosilicate zeolite cracking catalyst which contains passivating amounts of antimony.

As is known in the art, the amount of antimony needed to achieve a given level of passivation can vary depending upon the level of metal contaminants. Typically the antimony is employed in an amount such that the catalyst will contain antimony in an amount in the range of about 0.005 to about 10 weight percent, preferably about 0.01 to about 2 weight percent. The antimony can be added to the catalyst in any suitable manner. A currently preferred manner involves including suitable amounts of an antimony compound in the hydrocarbon feed.

A further understanding of the present invention will be provided by the following examples.

EXAMPLE I

This example demonstrates the effect of the inventive reduction process on a catalyst containing contaminating metals. The catalyst employed was a cracking catalyst which had ben used in a commercial cracking operation on feeds known to contain contaminating metals. The catalyst comprised crystalline aluminosilicate zeolite associated with amorphous silica-alumina. Properties of the used cracking catalyst are as follows:

| | |
|---|---|
| Surface Area, $m^2/g$ | 74.3 |
| Pore Volume, ml/g | 0.29 |
| Elemental Composition, Weight %: | |
| Aluminum | 21.7 |
| Silicon | 24.6 |
| Nickel | 0.38 |
| Vanadium | 0.60 |
| Iron | 0.90 |
| Cerium | 0.40 |
| Sodium | 0.39 |
| Carbon | 0.06 |
| Antimony | <0.02 |

This base equilibrium catalyst was placed in a fluidized bed reactor and heated while fluidized with air to about 1250° F. and maintained at that temperature for about 30 minutes while maintaining the catalyst in a fluidized state with air. The catalyst was then cooled to room temperature (about 25° C.) while fluidized with nitrogen. The resulting regenerated catalyst was then used to evaluate the effects of reduction on the regenerated catalyst. Control runs were carried out in which no reduction was employed.

The catalyst was evaluated in bench scale laboratory fluidized bed reactors at 510° C. (950° F.) with regeneration at 677° C. (1250° F.) between each cracking run. In the inventive runs the catalyst after regeneration with air was contacted with flowing hydrogen for one hour at 677° C. (1250° F.) before being cooled to 510° C. for the cracking operation.

The hydrocarbon feed used was West Texas topped crude having the following properties:

| | | |
|---|---|---|
| API gravity at 60° F. (16° C.)[1] | 21.4 | |
| Distillation, ° F. (° C.)[2] | | |
| IBP | 556 | (291) |
| 10% | 803 | (428) |
| 20% | 875 | (468) |
| 30% | 929 | (498) |
| 40% | 982 | (528) |
| 50% | 1031 | (555) |
| Carbon residue, Rams, wt. %[3] | 5.5 | |
| Elemental analysis | | |
| S, wt. % | 1.2 | |
| Ni, ppm | 5.24 | |
| V, ppm | 5.29 | |
| Fe, ppm | 29 | |
| Pour point, ° F. (° C.)[4] | 63 | (17) |
| Kinematic viscosity, cSt[5] | | |
| at 180° F. (82° C.) | 56.5 | |
| at 210° F. (99° C.) | 32.1 | |
| Refractive index at 67° C.[6] | 1.5 | |

[1]ASTM D 287-67
[2]ASTM D 1160-61
[3]ASTM D 524-64
[4]ASTM D 97-66
[5]ASTM D 445-65
[6]ASTM D 1747-62

The runs were made using a 7.4/1 catalyst/oil ratio. The results of those runs are set forth in Table I.

TABLE I

| Run No. | $H_2$ Pre-treatment | Conversion, Vol. % | Yield: Gasoline, Vol. % | Yield: SCF $H_2$/bbl Feed Conv. | Yield: Coke, Wt. % |
|---|---|---|---|---|---|
| 1 | No | 78.56 | 50.87 | 745 | 15.25 |
| 2 | No | 78.50 | 52.01 | 806 | 15.70 |
| 3 | Yes | 80.11 | 55.40 | 596 | 12.24 |
| 4 | Yes | 79.65 | 56.13 | 562 | 11.33 |
| 5 | Yes | 79.08 | 55.05 | 526 | 10.84 |
| 6 | Yes | 80.37 | 57.02 | 546 | 11.18 |

Comparison of the runs made without the $H_2$ pretreatment with the runs pretreatment shows that the inventive technique increased the conversion slightly (about 2%), but increased the yield of gasoline by 9%, while reducing the yield of hydrogen by 31% and coke by 29%.

EXAMPLE II

Another set of runs were conducted to evaluate the effect of temperature on the reduction step. These runs employed an unused cracking catalyst comprising crystalline aluminosilicate zeolite associated with amorphous silica-alumina.

The catalyst was first steam aged by contact with 23 psig steam at 1270° F. overnight. Properties of the steam aged catalyst are as follows:

| | |
|---|---|
| Surface Area, $m^2/g$ | 174 |
| Pore Volume, ml/g | 0.43 |
| Elemental Composition, Weight %: | |
| Aluminum | 30.6 |
| Silicon | 18.3 |
| Nickel | .01 |
| Vanadium | <.01 |
| Iron | .45 |

-continued

| | |
|---|---|
| Cerium | .06 |
| Lanthanum | <.02 |
| Phosphorus | (9.5 ppm) |
| Antimony | <.02 |

The steam aged catalyst was then impregnated with a solution of an organic nickel compound to yield a catalyst containing about 0.1 weight percent Ni. The thus contaminated catalyst was aged ten cycle with hydrogen and air before use, the aging ending with an oxidation rather than a reduction. A series of bench scale cracking runs were made using portions of the prepared catalyst. In the inventive runs, the hydrogen treatment involved contact with hydrogen at 220 GHSV for 30 minutes at either 1250° F., 950° F., or 850° F. For each of the three different treatment temperatures, the reactor was recharged with a catalyst sample that had had no such hydrogen pretreatment. The activity tests were run at 950° F., 7.4/1 catalyst to oil ratio with the feed being the same West Texas topped crude that was used in Example I. The results are shown in Table II.

TABLE II

| Run No. | Treatment Temp, ° F. | Conversion Vol. % | Coke Wt. % | $H_2$ SCF/bbl Feed Conv. | Gasoline, Vol. % |
|---|---|---|---|---|---|
| 7 | None[a] | 82.1 | 18.2 | 368 | 58 |
| 8 | 1250[b] | 85.5 | 15.7 | 211 | 61 |
| 9 | 950[b] | 84.2 | 14.6 | 287 | 61 |
| 10 | 850 | 84.7 | 17.0 | 508 | 57 |

[a]The results given are the average of three such runs.
[b]The results given are the average of two such runs.

The data show that pretreatment with hydrogen at 1250° F. and 950° F. showed improved catalytic performance. Coke and hydrogen yields decreased while conversion increased. Treatment with hydrogen at 850° F. gave a different type of results. The hydrogen yield increased from 368 to 508 SCF/Bbl converted and the gasoline yield decreased from 58 to 57 volume percent of the feed at a higher conversion. However, with successive hydrogen treatments at 850° F. more improvement was obtained. The results indicate, however, that reduction temperatures in the range of 950° to 1250° F. are preferable.

EXAMPLE III

This example illustrates the benefit of using reduction on a zeolitic cracking catalyst that contains antimony. The cracking catalyst used in these comparisons was an equilibrium catalyst from a commercial cracking operation. The catalyst comprised crystalline aluminosilicate zeolite associated with amorphous silica-alumina. Properties of this base cracking catalyst prior to oxidative regeneration are as follows:

| | |
|---|---|
| Surface Area, $m^2/g$ | 75.9 |
| Pore Volume, ml/g | 0.36 |
| Elemental Composition, Weight %: | |
| Aluminum | 23.4 |
| Silicon | 22.8 |
| Nickel | 0.38 |
| Vanadium | 0.58 |
| Iron | 0.85 |
| Cerium | 0.39 |

-continued

| | |
|---|---|
| Sodium | 0.46 |
| Antimony | <0.01 |

A portion of the regenerated base catalyst was impregnated with a cyclohexane solution of antimony tris(O,O-dipropyl phosophorodithioate) to provide a catalyst containing about 0.1 weight percent antimony. The catalyst was dried on a hot plate. In order to assure that the antimony-treated catalyst was comparable to an equilibrium catalyst, it was subjected to 10 aging cycles wherein each aging cycle involved fluidizing the catalyst with nitrogen for about 1 minute at about 900° F., heating to about 950° F. over about 2 minutes while fluidizing with hydrogen, then maintaining the temperature at about 950° F. for 1 minute while fluidizing with nitrogen, then heating to about 1200° F. for 10 minutes while fluidized with air, and then cooling to about 900° F. during about 0.5 minute while fluidizing with air. After the 10 aging cycles, the catalyst was cooled to room temperature (about 25° C.) while fluidized with nitrogen.

In one set of runs, the aged antimony-treated catalyst was subjected to hydrogenation according to this invention and used in lab scale cracking evaluation. In another set of runs, the aged antimony-treated catalyst was evaluated but without the inventive hydrogenation. Likewise runs were made using the portions of the non-antimony treated base catalyst with and without the inventive hydrogen pretreatment. The inventive hydrogen pretreatment involved contacting the catalyst with hydrogen at about 1250° F. for about 30 minutes with the hydrogen flow being about 250 GHSV. The cracking was done at 950° F. The feed was again a West Texas topped crude. The results of the evaluation are summarized in the following Tables III and IV.

TABLE III

| | | Results At 75% Conversion | | | |
|---|---|---|---|---|---|
| Sb | $H_2$ Pre-treatment | Coke, Wt. % Feed | Yields $H_2$ SCF/Bbl Feed Conv. | Gasoline Vol. % | 410–650° C. Vol. % |
| No | No | 15.0 | 790 | 51.0 | 17.1 |
| Yes | No | 13.2 | 530 | 53.8 | 17.1 |
| No | Yes | 12.3 | 675 | 53.8 | 17.4 |
| Yes | Yes | 11.2 | 540 | 555. | 17.1 |

TABLE IV

| | | Results At 7.0/1 Catalyst To Oil Ratio | | | | |
|---|---|---|---|---|---|---|
| Sb | $H_2$ Pre-treat-ment | Conver-sion Vol. % | Coke, Wt. % Feed | Yields $H_2$ SCF/Bbl Feed Conv. | Gaso-line Vol. % | 410–650° C. Vol. % |
| No | No | 76.0 | 15.4 | 805 | 51.2 | 16.5 |
| Yes | No | 76.8 | 13.6 | 535 | 54.0 | 16.2 |
| No | Yes | 74.5 | 12.2 | 665 | 53.8 | 17.6 |
| Yes | Yes | 75.0 | 11.2 | 540 | 55.5 | 17.1 |

These results clearly show that while antimony alone provides some improvement, hydrogenation without the use of antiomony provides more improvement in coke reduction. The results also show that the improvements obtained using both antimony and hydrogenation are generally superior to using only one of those passivation techniques. Thus at constant conversion, the use of both antimony and hydrogenation results in a 3 percent increase in gasoline yield and a 15 percent decrease in coke over the results obtained using antimony alone.

The above examples have been provided merely to illustrate the invention. Obviously, many modifications and variations can be made without departing from the spirit and scope of the invention.

What is claimed is:

1. In a process for the catalytic cracking of a hydrocarbon feed wherein said feed is contacted with a crystalline zeolite aluminosilicate cracking catalyst *containing at least one contaminating metal selecting from the group consisting of nickel, vanadium, and iron* under cracking conditions and at least a portion of said cracking catalyst is periodically regenerated by contact with a combustion supporting gas under regeneration conditions and at least a portion of the regenerated catalyst is employed in the catalytic cracking of hydrocarbon feed, the improvement consisting essentially of contacting at least a portion of said regenerated catalyst with a reducing gas under conditions suitable for countering effects of contaminating metals thereon *to produce a passivated catalyst* and employing at least a portion of said [reduced] *passivated* catalyst in cracking said hydrocarbon feed.

2. A process according to claim 1 wherein said cracking catalyst is contacted with said reducing gas at a temperature in the range of about 850° F. to about 1300° F.

3. A process according to claim 2 wherein said reducing gas comprises hydrogen.

4. A process according to claim 3 wherein said hydrocarbon feed contains at least one of nickel and vanadium.

[5. A process according to claim 4 wherein the catalyst that is contacted with said hydrogen contains antimony.]

[6. A process according to claim 5 wherein the antimony is applied to the catalyst in the form of antimony tris(O,O-dipropyl phosphorodithioate).]

[7. A process according to claim 5 wherein said antimony is applied to the catalyst by antimony tris(O,O-dipropyl phosphorodithioate) dissolved in the hydrocarbon feed.]

[8. A process according to claim 2 wherein the catalyst that is contacted with said reducing gas contains antimony.]

9. A process according to claim 2 wherein said reducing gas comprises at least one *gas selected from the group consisting* of carbon monoxide, hydrogen, propane, methane, and ethane.

10. A process according to claim [9] *2* wherein said reducing gas comprises regenerator off gases.

11. A process according to claim [9] *2* wherein said reducing gas comprises light gases from the catalytic cracker.

12. A method for passivating a crystalline zeolite alumino-silicate-containing catalyst utilized to crack hydrocarbon feedstock to lower molecular weight products in a reaction zone where the feedstock contains at least two metal comtaminants selected from the class consisting of nickel, vanadium, and iron and where at least some of the metal contaminants become deposited on the catalyst, which comprises passing the catalyst after regeneration, through a reduction zone maintained at a temperature of 600° to 704° C. for a time sufficient to at least partially passivate the metal contaminants on the catalyst, a reducing environment maintained in the reduction zone by the addition to the reduction zone of a material selected from the class consisting of hydrogen, carbon monoxide, and mixtures thereof, said passivated catalyst thereafter passing to said reaction zone without further processing.

13. In a hydrocarbon cracking process wherein:

A. hydrocarbon feedstock containing at least two metal [contaminates] *contaminants* selected from the class consisting of nickel, vanadium, and iron is passed into a cracking zone having a crystalline zeolite alumino-silicate-containing cracking catalyst therein at cracking conditions to form cracked hydrocarbon products and wherein coke and metal contaminants are deposited on the catalyst; and B. the coke and metal contaminated catalyst is passed to a regeneration zone maintained at regeneration conditions having a regeneration gas passing therethrough whereby at least a portion of the coke is removed from the catalyst, the improvement which comprises passing the catalyst from the regeneration zone through a reduction zone maintained at a temperature of 600° C. to 704° C. whereby the metal contaminants are at least partially passivated prior to the catalyst being returned to the [reaction] *cracking* zone, a reducing atmosphere maintained in the reduction zone by the addition to the reduction zone of a material selected from the class consisting of hydrogen, carbon monoxide, and mixtures thereof, said catalyst passing without further processing from the reduction zone to the cracking zone.

14. The process of claim 13 further comprising the steps of:

A. analyzing the amount of metal contaminants on the catalyst, and

B. adding to the [reaction] *cracking* a hydrocarbon feedstock containing a predetermined amount of a contaminant metal.

15. The process of claim 14 wherein the metal contaminant added *to the cracking zone* is selected from the class consisting of vanadium and iron.

[16. The process of claim 13 further comprising the addition of a passivation agent selected from the class consisting of antimony, tin, bismuth, and manganese to further passivate the catalyst.]

17. In a hydrocarbon cracking process wherein:

A. hydrocarbon feedstock containing at least two metal [contaminates] *contaminants* selected from the class consisting of nickel, vanadium and iron is passed into a reaction zone having a crystalline zeolite alumino-silicate-containing cracking catalyst therein at cracking conditions to form cracked hydrocarbon products and wherein coke and metal contaminants are deposited on the catalyst;

B. the coke and metal contaminated catalyst is passed from the reaction zone to a regeneration zone maintained at regeneration conditions having a regenerating gas passing therethrough to remove at least a portion of the coke from the catalyst, the improvement which comprises:

i. passing the catalyst from the regeneration zone through a reduction zone maintained at a temperature within the range of about 600° C. to about 704° C. in the presence of hydrogen, carbon monoxide, or mixtures thereof to passivate the metal contaminants on the catalyst; and ii. passing the catalyst from the reduction zone to the reaction zone without further processing.

18. A method for passivating a cracking catalyst comprising crystalline zeolite aluminosilicate utilized to crack hydrocarbon feedstock to lower molecular weight products in a reaction zone, wherein the feedstock contains at least one metal contaminant selected from the class consisting of nickel, vanadium, and iron and wherein at least some of the metal contaminants become deposited on the catalyst, which comprises passing the catalyst after regeneration through a reduction zone maintained at a temperature sufficient to at least partially passivate the metal contaminants on the catalyst, maintaining the catalyst in the reduction zone for a time sufficient to at least partially passivate the metal [contaminates] *contaminants* on the catalyst, wherein the reduction environment is maintained in the reduction zone by the addition to the reduction zone of a material selected from the class consisting of hydrogen, carbon monoxide, and mixtures thereof, said passivated catalyst thereafter passing to said reaction zone without further processing in the reduced state.

19. In a hydrocarbon cracking process wherein:

A. hydrocarbon feedstock containing at least one metal [contaminates] *contaminant* selected from the class consisting of nickel, vanadium, and iron is passed into a reaction zone containing a cracking catalyst comprising crystalline zeolite aluminosilicate under cracking conditions to form cracked hydrocarbon products and wherein coke and metal contaminants are deposited on the catalyst; and B. the coke and metal contaminated catalyst is passed to a regeneration zone maintained at regeneration conditions having a regeneration gas passing therethrough whereby at least a portion of the coke is removed from the catalyst, the improvement which consists essentially of passing the catalyst from the regeneration zone through a reduction zone maintained at a temperature sufficient to at least partially passivate the metal contaminants on the catalyst, maintaining the catalyst in the reduction zone for a time sufficient to at least partially passivate the metal contaminants on the catalyst, a reducing atmosphere being maintained in the reduction zone by the addition to the reduction zone of a material selected from the class consisting of hydrogen, carbon monoxide, and mixtures thereof, and passing at least a portion of said [reduced] *passivated* catalyst in the reduced state to the reaction zone.

20. The process of claim 19 wherein the reduction zone is maintained at a temperature in the range of about 600° C. to about 704° C.

21. In a hydrocarbon cracking process wherein a hydrocarbon feedstock is passed into a reaction zone containing a cracking catalyst comprising crystalline zeolite aluminosilicate that is contaminated with at least one metal contaminant selected from the group consisting of nickel, vanadium, and iron and coke and said metal contaminated catalyst is passed to a regeneration zone maintained at [regeration] *regeneration* conditions having a regeneration gas passing therethrough whereby at least a portion of the coke is removed from the catalyst and regenerated catalyst is recycled back to the reaction zone, the improvement consisting essentially of passing the catalyst from the regeneration zone through a reduction zone containing a reducing gas maintained at a temperature sufficient to at least partially passivate the metal contaminants on the catalyst, maintaining the catalyst in the reduction zone for a time sufficient to at least partially passivate the metal contaminants on the catalyst, and recycling [reduced] *the thus passivated* catalyst in the reduced state to the reaction zone.

22. A method according to claim 21 wherein said reducing gas consists essentially of at least one gas selected from the group consisting of carbon monoxide, hydrogen, propane, methane, and ethane.

23. A method according to claim 22 further comprising analyzing the amount of metal contaminants on the contaminated catalyst and adding to the reaction zone a hydrocarbon feedstream containing vanadium, nickel, and iron.

24. A method according to claim 22 further including monitoring the composition of the metal contaminants on said catalyst and combining said recycled catalyst with a hydrocarbon feedstream containing vanadium, nickel, and iron.

25. A method according to claim 24 wherein the major portion of said metal contaminant comprises nickel.

26. A method according to claim 24 wherein the reduction zone is maintained at a temperature of 454° C. to 704° C. to at least partially passivate said metal contaminant.

27. A process according to claim 26 wherein the temperature in the reduction zone is maintained within the range of about 600° C. to about 704° C.

[28. A process according to claim 27 further comprising the addition of a passivation agent selected from the class consisting of antimony, tin, bismuth, and manganese to further passivate the catalyst.]

29. A method for passivating adverse effects of metal contaminants on a cracking catalyst consisting essentially of a crystalline zeolite aluminosilicate containing at least one metal selected from the group consisting of nickel, vanadium, and iron which comprises passing the catalyst after regeneration through a reduction zone maintained at a temperature sufficient to at least partially passivate the metal contaminants on the catalyst, maintaining the catalyst in the reduction zone for a time sufficient to at least partially passivate the metal contaminants on said catalyst, wherein the reducing environment is maintained in the reduction zone by the addition to the reduction zone of a reducing gas, wherein the [reduced] *thus passivated* catalyst is passed to the cracking zone[, and said reduced catalyst] *and* is combined with a hydrocarbon feedstream containing nickel, vanadium and iron.

30. A method according to claim 29 wherein the composition of the metal [contaminates] *contaminants* on said catalyst is monitored.

31. A method according to claim 30 wherein said reducing gas consists essentially of at least one gas selected from the group consisting of carbon monoxide, hydrogen, propane, methane, and ethane.

32. A method according to claim 31 wherein the reduction zone temperature is maintained at a temperature of 454° C. to 704° C. to at least partially passivate said metal contaminants on said catalyst.

33. A method for passivating a crystalline zeolite alumino-silicate-containing catalyst *which has been* utilized to crack hydrocarbon feedstock to lower molecular weight products in a reaction zone where the feedstock contains at least one metal contaminant selected from the class consisting of nickel, vanadium, and iron and where at least some of the metal contaminant becomes deposited on the catalyst, which consists essentially of exposing the catalyst after regeneration to a reducing environment maintained at a temperature in the range of about 454° C. to about 704° C. for a time sufficient to counter adverse effects of said contaminating metals on said catalyst, said reducing environment being maintained by a material selected from the class consisting of hydrogen, carbon monoxide, and mixtures thereof, and passing at least a portion of [said reduced] *the thus passivated* catalyst back to said reaction zone.

34. In a hydrocarbon cracking process wherein:

A. hydrocarbon feedstock containing at least one metal contaminant selected from the class consisting of nickel, vanadium, and iron is passed into a reaction zone containing a cracking catalyst comprising crystalline zeolite aluminosilicate under cracking conditions to form cracked hydrocarbon products and wherein coke and metal contaminants are deposited on the catalyst; and B. the coke and metal contaminated catalyst is subjected to regeneration with a regenerating gas whereby at least a portion of the coke is removed from the catalyst, the improvement which consists essentially of subjecting catalyst resulting from the regeneration to a reducing atmosphere at a temperature in the range of about 454°

C. to about 704° C. so as to counter adverse effects of said contaminating metals on said catalyst, and passing at least a portion of [said reduced] *the thus passivated* catalyst back to said reaction zone.

35. A process for the cracking of a hydrocarbon feedstock comprising contacting said feedstock under cracking conditions in a cracking zone with a *used* cracking catalyst prepared by *a process consisting essentially of* (1) starting with a contaminated cracking catalyst comprising crystalline zeolite alumino-silicate wherein said contaminants comprise carbon and at least one metal contaminant selected from the group consisting of nickel, vanadium, and iron, (2) exposing said contaminated cracking catalyst in an oxidation step to a combustion-supporting gas under conditions sufficient to result in combustion of carbon contaminant, and (3) then exposing the resulting catalyst in a reduction step to a reducing gas under conditions suitable for countering adverse effects of said contaminating metals, *said process being further characterized by the fact that the contaminated cracking catalyst is not subjected to oxidation or removal of contaminating metals subsequent to the reduction step.*

36. A process according to claim 35 wherein said cracking is conducted to a temperature in the range of about 800° F. to about 1200° F.

37. A process according to claim 36 wherein cracking catalyst is periodically removed from said cracking zone and exposed in an oxidation step to a combustion-supporting gas under conditions sufficient to result in combustion of carbon thereon, and then the resulting catalyst is exposed in a reduction step to a reducing gas under conditions suitable for countering adverse effects of said contaminating metals, and catalyst from the reducing step is recycled to the cracking zone.

38. A process according to claim 36 wherein cracking catalyst is periodically removed from said cracking zone and exposed in an oxidation step at a temperature in the range of about 950° F. to 1500° F. to a combustion-supporting gas under conditions sufficient to result in combustion of carbon thereon, and then the resulting catalyst is exposed in a reduction step to a reducing [as] *gas* at a temperature in the range of about 850° F. to about 1300° F. under conditions sufficient to counter adverse effects of said contaminating metals, and catalyst from the reducing step is recycled to the cracking zone.

39. A process according to claim 38 wherein said reducing gas comprises gases resulting from the combustion of carbon on said contaminated catalyst, said gases comprising carbon monoxide and said hydro-carbon feedstock contains 1.2 weight percent sulfur.

[40. A process according to claim 39 wherein said contaminated catalyst contains at least one metal selected from the group consisting of antimony, tin, bismuth, and manganese.]

[41. A process according to claim 40 wherein said contaminated catalyst contains about 0.005 to about 10 weight percent antimony.]

42. A process according to claim [41] *38* wherein said hydrocarbon feedstock comprises at least one metal selected from the group consisting of nickel, vanadium, and iron in concentrations within the following ranges:

| | |
|---|---|
| Nickel | 0.02–100 ppm |
| Vanadium | 0.02–500 ppm |
| Iron | 0.02–500 ppm. |

43. A process according to claim [41] *38* wherein the *starting contaminated cracking* catalyst contains 38 ppm nickel, 58 ppm vanadium, and 85 ppm iron.

44. A process according to claim [41] *38* wherein said hydrocarbon feedstock comprises at least one component selected from the group consisting of heavy residual and topped crude.

45. A process according to claim [41] *38* wherein said reducing gas comprises hydrogen.

46. In a process for the catalytic cracking of a hydrocarbon feed wherein said feed is contacted with a crystalline zeolite alumino-silicate cracking catalyst under cracking conditions and at least a portion of said cracking catalyst is periodically regenerated by contact with a combustion-supporting gas under regeneration conditions and at least a portion of the regenerated catalyst is employed in the catalytic cracking of the hydrocarbon feed and wherein the cracking catalyst becomes contaminated by at least one metal selected from the group consisting of nickel, iron, vanadium, and copper, the improvement comprising contacting at least a portion of the regenerated catalyst with a reducing gas under conditions suitable for reducing the adverse effects of contaminating metals thereon and recycling the resulting catalyst to the cracking zone without any intermediate oxidation or removal of the contaminating metal.

47. A process according to claim 46 wherein said cracking catalyst becomes contaminated with nickel.

48. A process according to claim 46 wherein nickel is the major metal contaminant of the group consisting of nickel, iron, vanadium, and copper.

49. A process according to claim 46 wherein nickel and vanadium make up the major portion of the contaminants on said catalyst.

*50. A process according to claim 1 wherein said cracking catalyst contains at least one contaminant metal selected from the group consisting of nickel and vanadium.*

*51. A process according to claim 4 wherein the amount of nickel in the hydrocarbon feed, if present, is in the range of 0.02 to 100 ppm and the amount of vanadium in the hydrocarbon feed, if present, is in the range of 0.02 to about 500 ppm and the amount of hydrogen employed in the reducing step is in the range of about 0.1 to about 20 standard cubic feed per minute per pound of said contaminant metal in the catalyst.*

*52. A process according to claim 3 wherein the feed that is contacted with the reduced catalyst contains at least one contaminating metal selected from nickel and vanadium, the amount of each such contaminating metal being at least about 0.02 ppm, and the regenerated cracking catalyst is contacted with said reducing gas at a temperature in the range of about 850° F. to about 1300° F. for a time of about 0.05 minutes to about two hours before being recycled for employment in the catalytic cracking of hydrocarbon feed and the amount of hydrogen employed in the reducing step is in the range of about 0.1 to about 20 standard cubic feet per minute per pound of said contaminant metal in the catalyst.*

*53. A process according to claim 2 wherein said reducing gas comprises at least one propane, methane, and ethane.*

*54. A process according to claim 2 wherein said reducing gas comprises carbon monoxide.*

*55. A process according to claim 46 wherein said cracking catalyst becomes contaminated by at least one metal selected from the group consisting of nickel and vanadium and said reducing gas comprises at least one of hydrogen, methane, ethane, and propane.*

*56. In a cracking process wherein a hydrocarbon feed is contacted with a cracking catalyst in a cracking step in a cracking zone at a temperature in the range of about 800° F. to about 1200° F., said cracking catalyst comprising crystalline zeolite aluminosilicate that is contaminated with at least one contaminating metal selected from the group consisting of nickel and vanadium, and at least a portion of the cracking catalyst is periodically removed from the cracking zone and subjected to a regeneration step involving contact with a combustion supporting gas at a temperature in the range of about 950° F. to about 1500° F. in a*

*regeneration zone to result in the combustion of carbon existing on said cracking catalyst, and at least a portion of the thus regenerated catalyst is recycled for reuse in the cracking step, the improvement consisting essentially of countering adverse effects of said contaminating metals on the regenerated catalyst by removing at least a portion of the regenerated catalyst from the regeneration zone and subjecting said removed regenerated catalyst to a passivation step involving contact with hydrogen at a temperature in the range of about 850° F. to about 1300° F. and then recycling at least a portion of the catalyst that was subjected to said passivation step to the cracking zone without any intermediate oxidation or removal of contaminating metals from the product of the passivation step.*

*57. A process for cracking a hydrocarbon feedstock comprising contacting a hydrocarbon feedstock with a cracking catalyst comprising crystalline zeolite aluminosilicate containing at least one contaminating metal selected from the group consisting of nickel, vanadium, and iron in a cracking zone to effect cracking of the hydrocarbon feedstock, periodically removing at least a portion of said cracking catalyst from the cracking zone and sending said removed catalyst to a regeneration zone in which carbon is oxidized and thereby removed from said catalyst, at least a portion of the thus regenerated catalyst is removed from the regeneration zone and subjected to a passivation step in a passivation zone by contacting said regenerated catalyst with at least one gas selected from the group consisting of hydrogen, methane, ethane, and propane at passivation reaction conditions, and then at least a portion of the thus passivated catalyst is recycled to the cracking zone without any intermediate oxidation or removal of contaminating metals.*

*58. A process according to claim 57 wherein said hydrocarbon feedstock contains at least one metal contaminant selected from the group consisting of nickel and vanadium.*

*59. A process according to claim 58 wherein said passivation reaction conditions include a temperature in the range of about 850° F. to about 1300° F.*

*60. A process according to claim 58 wherein said passivation reaction conditions include a temperature in the range of about 850° F. to about 1300° F.*

*61. A process according to claim 59 wherein said gas includes hydrogen.*

*62. A process according to claim 12 where hydrogen is employed in the reduction zone.*

*63. A process according to claim 13 where hydrogen is employed in the reduction zone.*

*64. A process according to claim 17 where hydrogen is employed in the reduction zone.*

*65. A process according to claim 18 where hydrogen is employed in the reduction zone.*

*66. A process according to claim 19 where hydrogen is employed in the reduction zone.*

*67. A process according to claim 21 wherein the reducing gas comprises hydrogen.*

*68. A process according to claim 29 wherein the reducing gas comprises hydrogen.*

*69. A process according to claim 33 wherein hydrogen is employed in the reducing environment.*

*70. A process according to claim 34 wherein hydrogen is employed in said reducing atmosphere.*

*71. A process according to claim 46 wherein said reducing gas comprises hydrogen.*

* * * * *